US011737468B2

(12) United States Patent
Garland et al.

(10) Patent No.: US 11,737,468 B2
(45) Date of Patent: Aug. 29, 2023

(54) METHOD FOR RESTRUCTURING A CHICKEN THIGH

(71) Applicants: Daniel C Garland, Marriottsville, MD (US); Matthew G Coulter, Mt Airy, MD (US)

(72) Inventors: Daniel C Garland, Marriottsville, MD (US); Matthew G Coulter, Mt Airy, MD (US)

( * ) Notice: Subject to any disclaimer, the term of this patent is extended or adjusted under 35 U.S.C. 154(b) by 86 days.

(21) Appl. No.: 17/529,378

(22) Filed: Nov. 18, 2021

(65) Prior Publication Data

US 2022/0151249 A1 May 19, 2022

Related U.S. Application Data

(60) Provisional application No. 63/115,138, filed on Nov. 18, 2020.

(51) Int. Cl.
*A22C 21/00* (2006.01)
(52) U.S. Cl.
CPC ................ *A22C 21/0023* (2013.01)
(58) Field of Classification Search
CPC ........... A22C 21/0023; A22C 21/0076
See application file for complete search history.

(56) References Cited

U.S. PATENT DOCUMENTS

| | | | | | |
|---|---|---|---|---|---|
| 4,967,447 | A | * | 11/1990 | Romaine | A22C 25/00 452/149 |
| 4,993,113 | A | * | 2/1991 | Hazenbroek | A22C 21/0076 452/167 |
| 5,368,519 | A | * | 11/1994 | Curtis | A22C 21/0084 426/644 |
| 6,428,838 | B1 | * | 8/2002 | Gagliardi, Jr. | A23L 13/55 426/644 |
| 7,201,648 | B1 | * | 4/2007 | Ruddle | A22C 21/0076 452/198 |
| 2005/0266785 | A1 | * | 12/2005 | Gagliardi | A22C 21/0076 452/135 |

* cited by examiner

*Primary Examiner* — Richard T Price, Jr.
(74) *Attorney, Agent, or Firm* — Royal W. Craig; Gordon Feinblatt LLC

(57) ABSTRACT

A method for producing a mock chicken wing drumette from a thigh by a unique cut process comprising the steps of trimming off all but 0.787 inches (2 cm) of the thigh meat from the left side of the thigh bone; trimming off an equal amount of thigh meat from the right side of the thigh bone; trimming off a section of thigh meat at the ball joint by a 30-degree offset undercut to leave the ball joint protruding and accessible, frenching the ball joint, and retracting meat remain the ball joint back along the thigh bone to leave approximately a 0.25-1" length of thigh bone protruding at the ball joint and a ball of bunched meat at the opposing end of the thigh bone. This resembles a chicken wing drumette and provides a wing-like experience when eating Buffalo style.

23 Claims, 6 Drawing Sheets

METHOD FOR RESTRUCTURING A CHICKEN THIGH

CROSS-REFERENCE TO RELATED APPLICATION(S)

The present application derives priority from U.S. provisional application Ser. No. 63/115,138 filed 18 Nov. 2020.

BACKGROUND OF THE INVENTION

1. Field of the Invention

The present invention relates generally to food preparation techniques and, more particularly, to a method for preparing a mock wing drumette by restructuring a chicken thigh.

2. Description of the Background

There are several versions of the story of the invention of the Buffalo chicken wing circa 1964s, but regardless of origin they have become an immensely popular menu item. During the 1970s the recipe spread quickly to many restaurants and bars throughout New York, and then nationally thanks to franchises including Domino's, Pizza Hut and Buffalo Wild Wings.

Chicken wings are typically cut into three pieces: tips that are unsuitable for food use, intermediate wings, and a 'drummette' that connects to the body. The drummettes provide the most satisfying part of the wing-eating experience. The meat is tender, juicy, and savory, wrapped in a crispy fried skin, and presented lollipop style atop an easy-to-grasp bone. However, as chicken wings continue to rise in popularity so too does their price.

In conventional poultry processing, chickens are sold fresh to processors. The processors cut drumsticks, thighs, leg quarters, wings, breasts and more, pack it in trays and wrap it. Whole or individual parts of birds are packaged raw for sale. The package often contains all of the same parts. Due to the demand for wings processors are finding it more difficult to sell all their chicken parts.

Many people consider chicken thighs to be superior to chicken wings in many respects: they are less bony, have moister meat, and are far less expensive. Nevertheless, chicken thighs provide a markedly different aesthetic and sensory experience. The meat clings loose to the bone, and the bone is not easy-to-grasp. It would be greatly advantageous to produce a mock chicken wing drumette from a thigh by a unique restructuring and cooking process that ultimately results in a more familiar wing-eating experience.

SUMMARY OF THE INVENTION

It is an object of the invention to provide a method for producing a mock chicken wing drumette from a thigh by a unique restructuring process involving precision cutting and cooking.

It is another object of the invention to provide a method for producing a chicken "thigh wing" that provides a wing-like experience when eating. The method begins with an existing piece of chicken thigh having a bone-in, the bone running end-to-end from a cut end to a ball joint. The method further comprises the following steps.

$1^{st}$: if skin is attached, deskinning the chicken thigh piece.

2d: trim excess meat from the left side of the thigh, optimally leaving 0.787 inches (2 cm)) of meat on the left side of the thigh bone.

3d: trim excess meat from the right side of the thigh, optimally leaving 0.787 inches (2 cm) of meat on the right side of the thigh bone.

$4^{th}$: 30-degree ball joint undercut leaves the ball joint protruding and accessible.

$5^{th}$: frenching the meat from the ball joint by cutting the meat away from the top of the thigh (after 30-degree cut);

$6^{th}$: retracting meat back along the thigh bone to leave approximately a 0.635-2.54 cm (0.25-1") length of thigh bone protruding at the ball joint and a ball of bunched meat at the opposing end of the thigh bone.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

The present invention is a method for restructuring a chicken thigh to produce a mock chicken wing from the thigh, e.g., a "thigh wing" that looks and tastes like a chicken wing and provides a wing-like eating experience.

Figure 1:
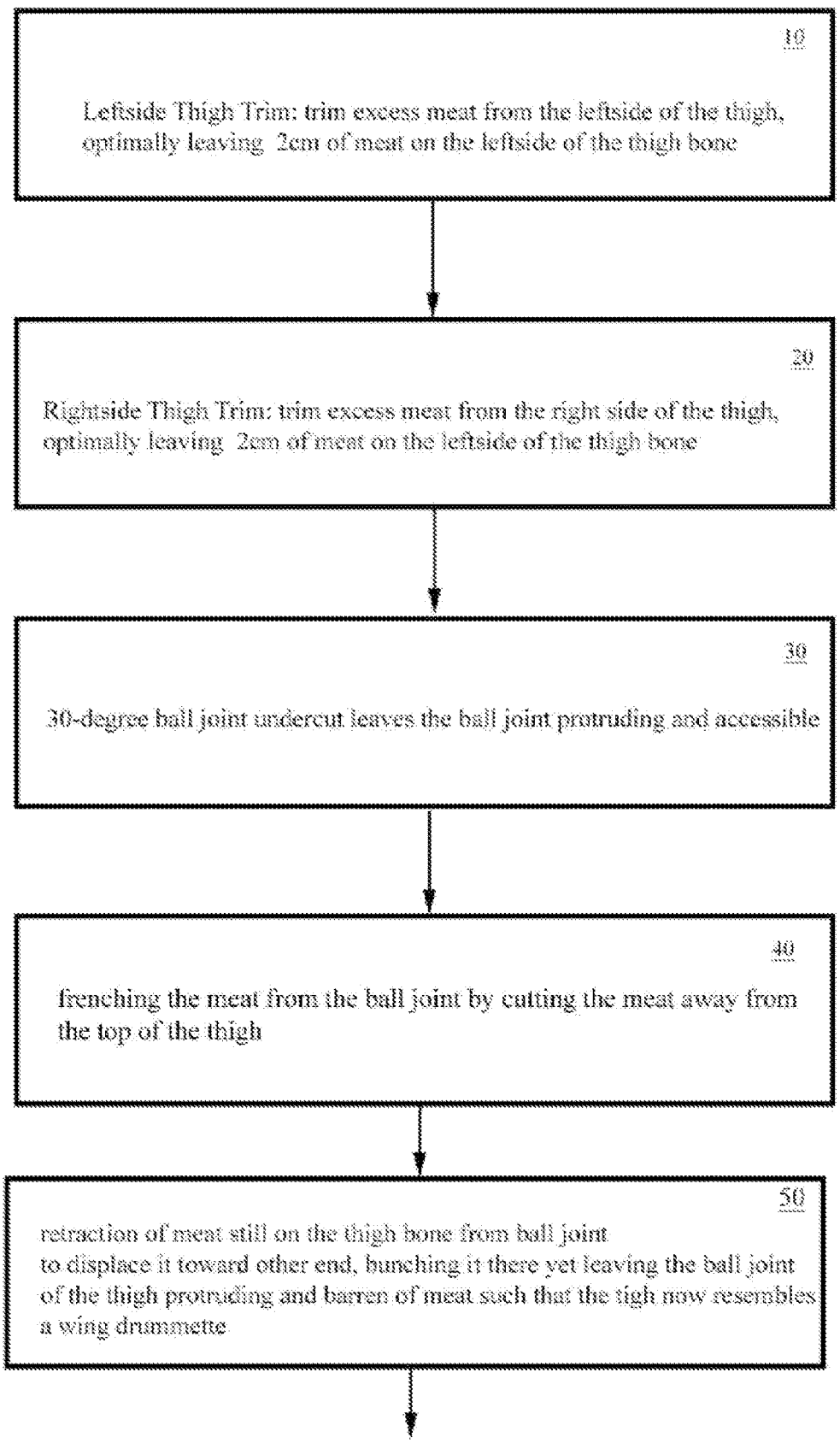
FIG. 1 is a block diagram of the major process steps of the invention.

FIG. 1 is a block diagram of the major process steps 10-50 of the invention and FIGS. 2-6 are overhead views of steps 10-50 of FIG. 1. With combined reference to FIGS. 1 and 2, the process begins with an existing chicken thigh with bone in and deskinned, the thigh having been cut at one end in a conventional manner to remove the drumstick and having been disjointed at the other from the chicken. Thus, the thigh bone runs from the cut end to the dejointed end along an axis. If skin-on, the thigh piece is deskinned and placed face down on a cutting board such that the thigh bone runs vertically up the center (see FIG. 2 left inset).

Figure 2:
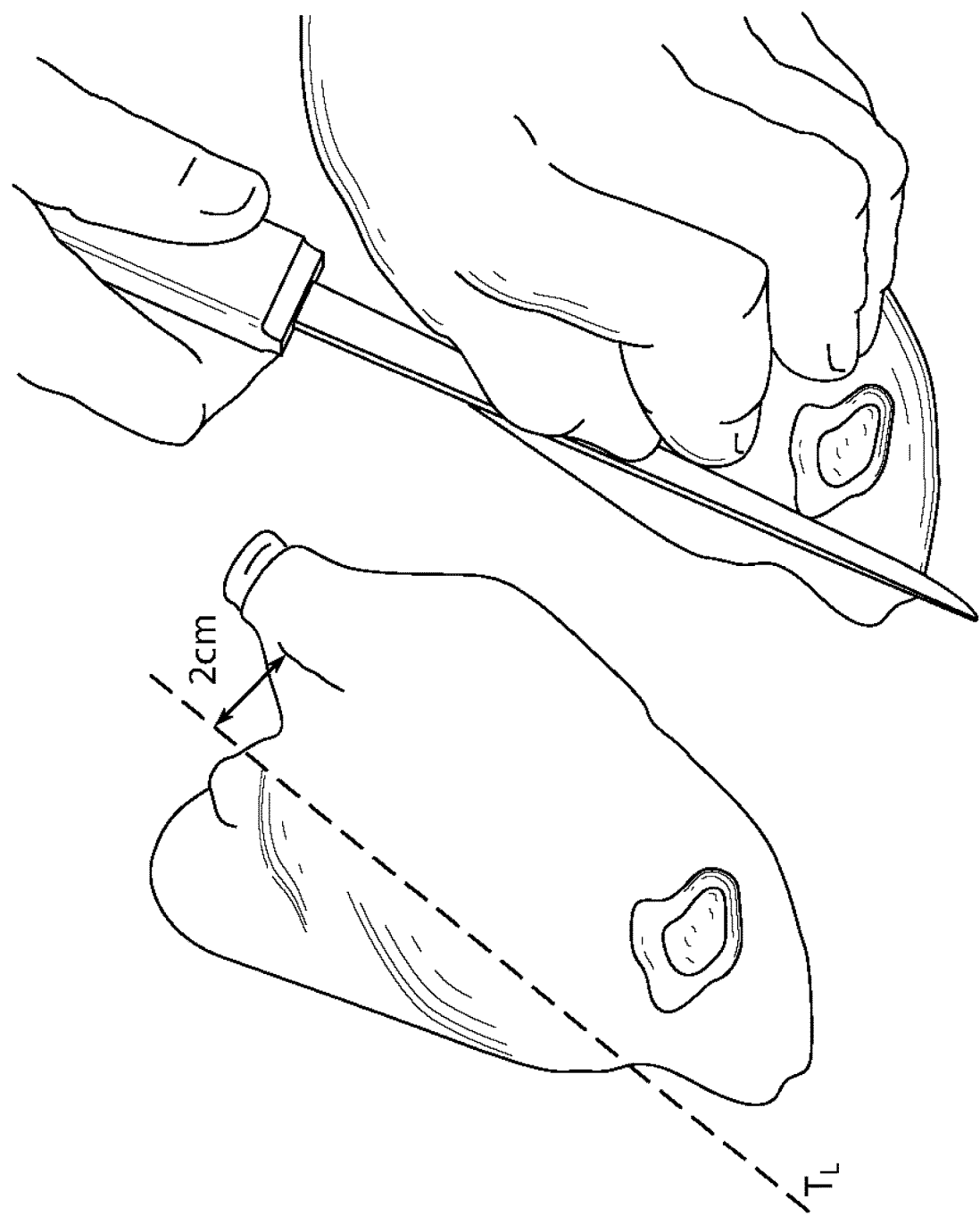
FIG. 2 is a front perspective view of the left-side thigh trim step 10 of FIG. 1.

At step 10 a left-side thigh trim cut is made to trim the left side of the thigh piece of all but approximately 0.787 inches (2 cm) of thigh meat. This can be, for example, a 90-degree-vertical left thigh trim cut made parallel to and offset from the thigh bone. The left-side thigh trim cut is made along axis $T_L$ optimally parallel to the thigh bone and 0.787 inches (2 cm) offset outward therefrom as shown in FIG. 2. The left-side thigh trim cut may be within an acceptable range of from +/−5 degrees from $T_L$ and from 0.394-1.575 inches (1 cm-4 cm) from the bone to leave an acceptable amount of thigh meat to accomplish the present purpose. As seen in FIG. 2 the trimmed piece is removed.

Figure 3:
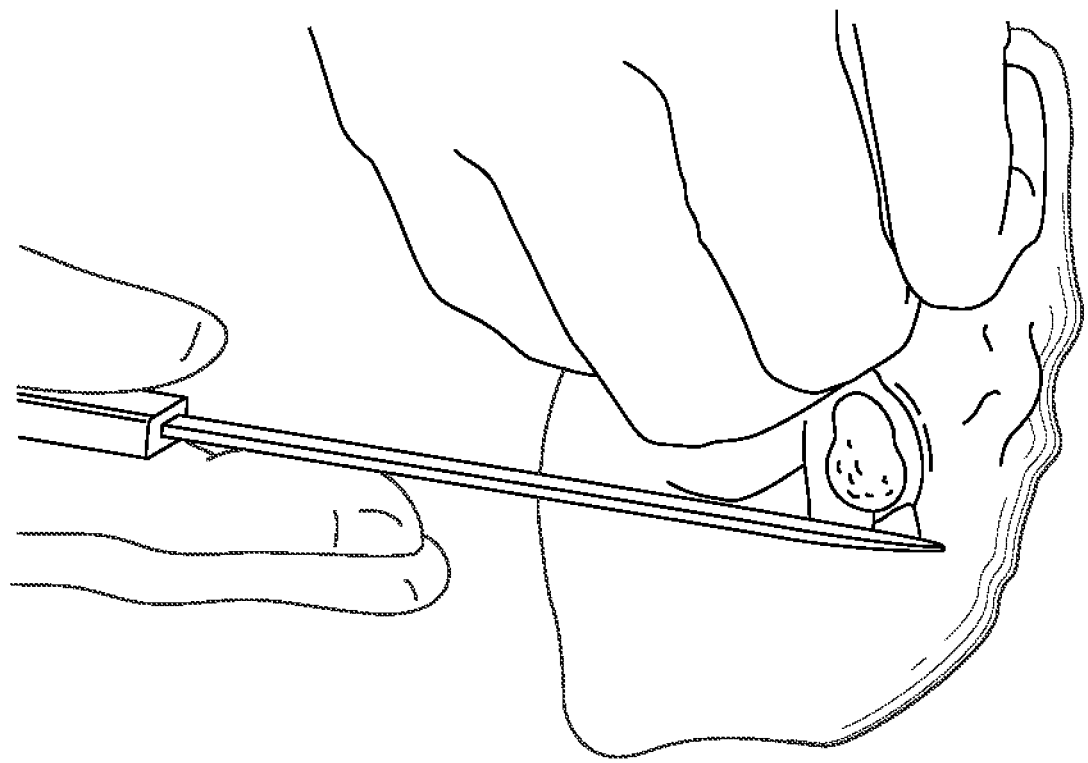
FIG. 3 is a front perspective view of the right-side thigh trim step 20 of FIG. 1.
Figure 3:
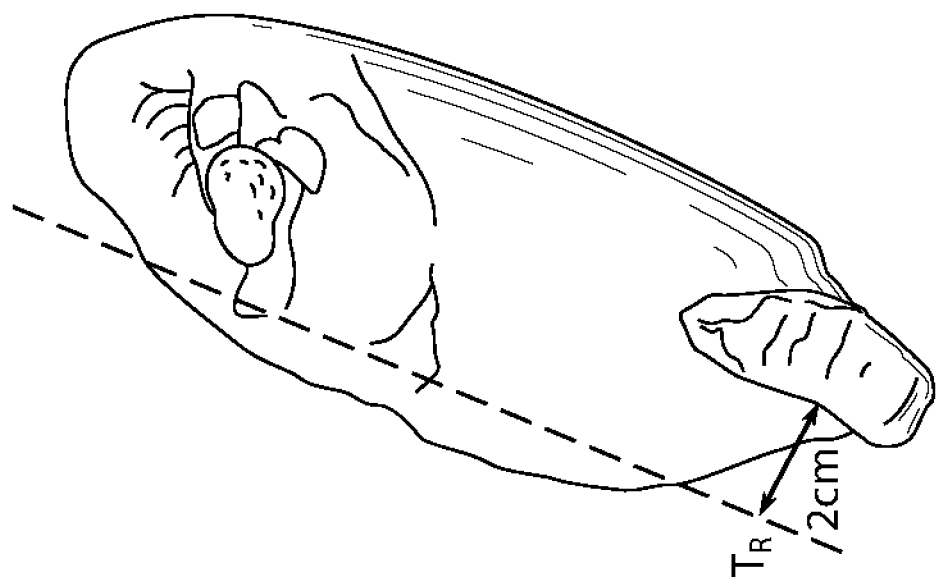

At step 20 a right-side thigh trim cut is made to trim the right side of the thigh piece of all but approximately 0.787 inches (2 cm) of thigh meat. This can be, for example, a 90-degree-vertical right thigh trim cut made parallel to and offset from the thigh bone to remove all but approximately 0.787 inches (2 cm) of the bulk of the thigh meat from the right of the thigh bone. The right-side thigh trim cut is made along axis $T_R$ optimally parallel to the thigh bone as well, and 0.787 inches (2 cm) outward therefrom as shown in FIG. 3, but may be within a range of from +/−5 degrees from parallel and from 0.394-1.575 inches (1 cm-4 cm) from the bone to leave an acceptable amount of thigh meat to accomplish the present purpose. As seen in FIG. 3 the trimmed piece is removed.

Figure 4:
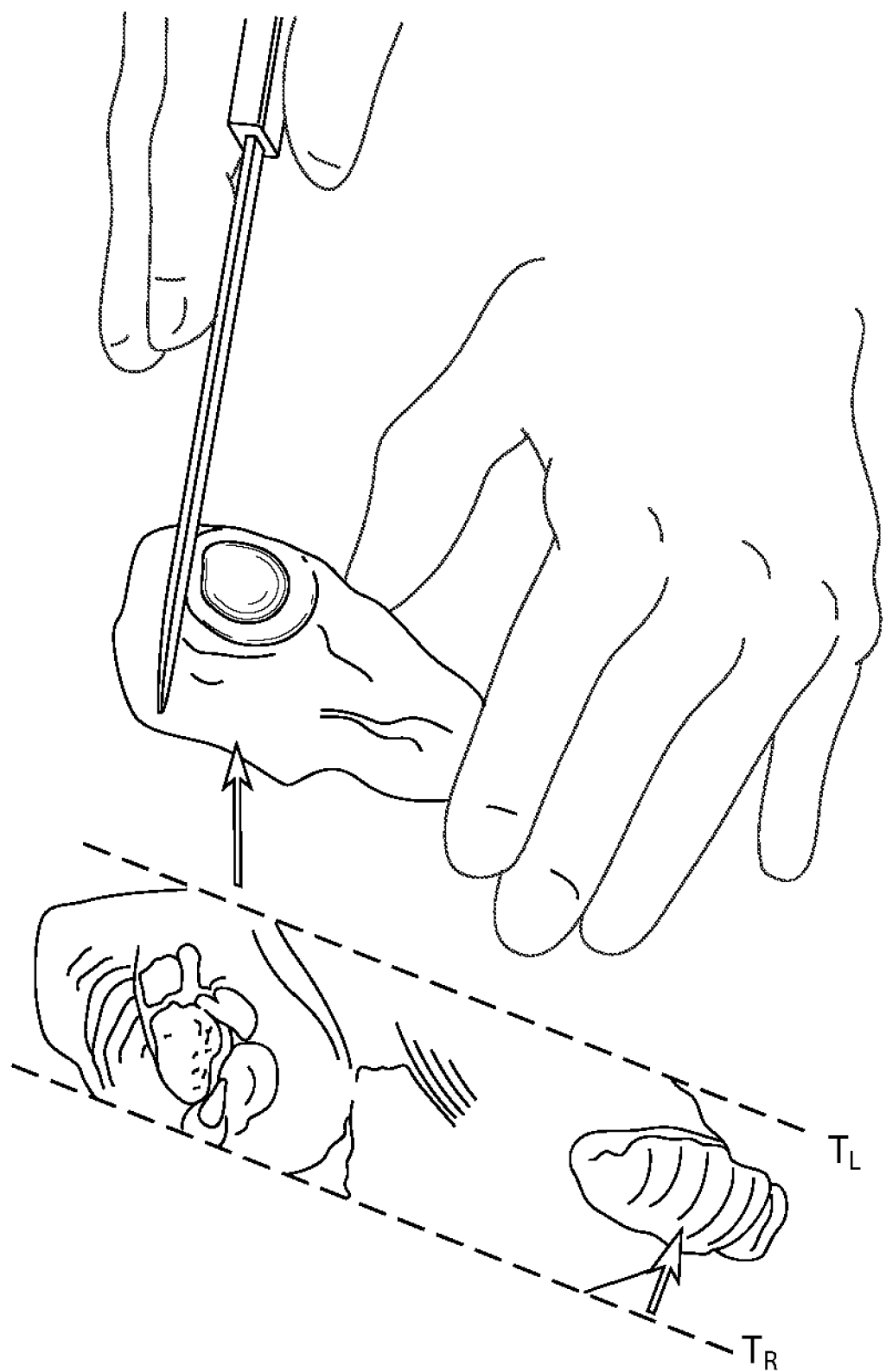
FIG. 4 is a front perspective view of the 30-degree ball joint undercut step 30 of FIG. 1.

At step 30 the thigh piece is rotated 90 degrees and a 30-degree ball joint undercut leaves a 0.197-0.394 inch (0.5-1 cm) length at the distal end of the of bone at the ball joint protruding and accessible. This may be, optimally, an offset cut made at a 30 degree inward/downward angle underneath the bone at the ball joint end of the thigh bone. The 30-degree ball joint undercut is seen in FIG. 4. The purpose of the ball joint undercut is simply to expose the tip of the thigh bone such that it protrudes approximately 0.197-0.394 inch (0.5-1 cm), and so a 0.197-0.394 inch (0.5-1 cm) inward cut along the bone at an angle within a range of from 5-40 degrees is suitable.

Figure 5:
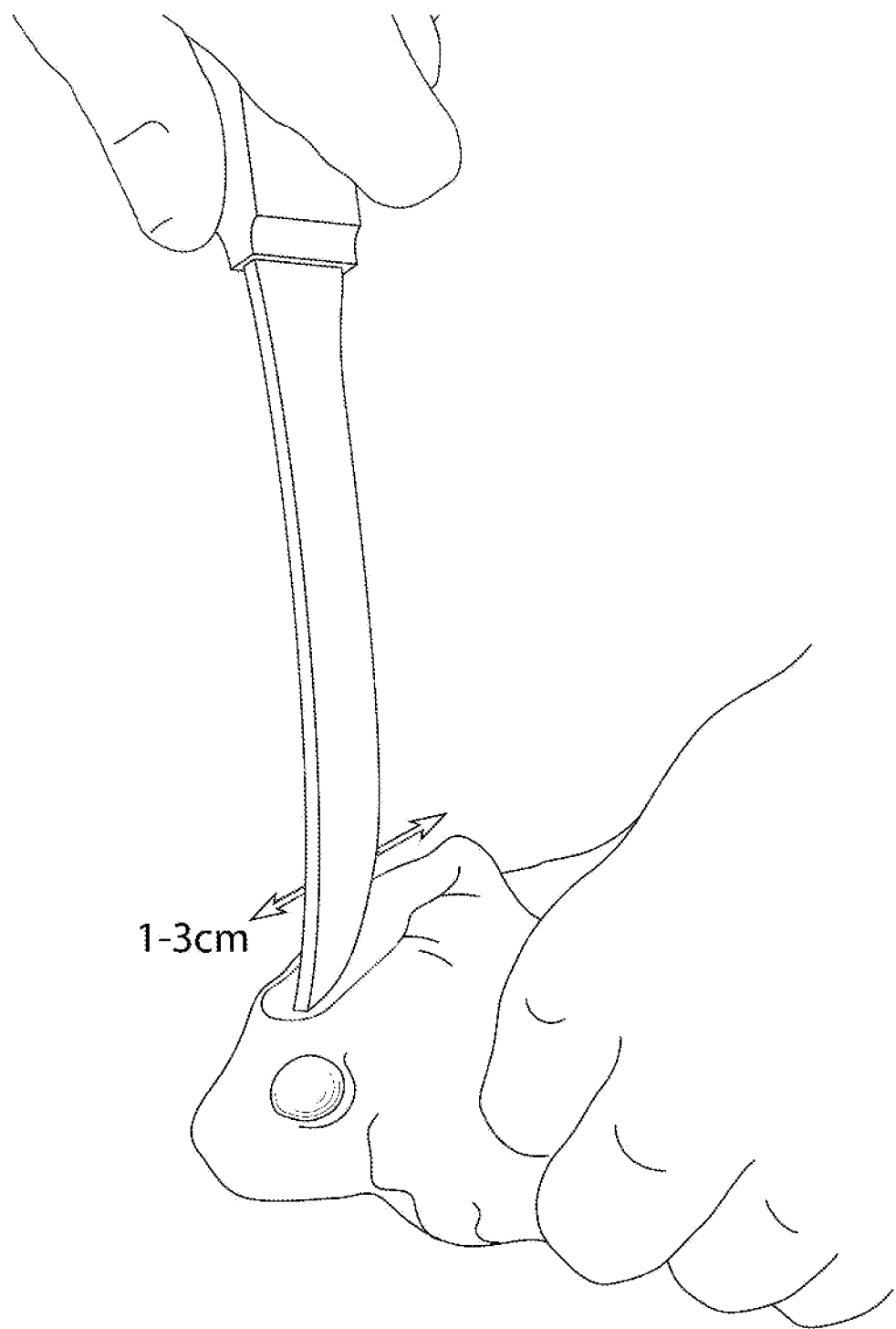
FIG. 5 is a front perspective view of the frenching step 40 of FIG. 1.

After the ball joint undercut of step 30, the tip of the thigh bone is exposed and at step 40 the meat is frenched from the ball joint. "Frenching" is a culinary term of art for the process of cutting away fat and meat from the bone for aesthetic presentation. The term frenching is herein defined as shaving meat away from the thigh bone in equal-length downward strokes angularly spaced at equal angular intervals encircling the bone, but without severing the meat. As seen in FIG. 5, to french the chicken thigh, run the knife at an angle within a range of from 5-40 degrees up and down along the thigh bone beneath the joint, optimally ¼" (0.635 cm), preferably within a range of from ¼"-1" (0.635-2.54 cm) depending on the size of the thigh preferably at four-to-six equal angular intervals encircling the bone, and pushing the meat down toward the cut end to reveal the bone, thereby essentially scraping the meat from the revealed bone.

Figure 6:
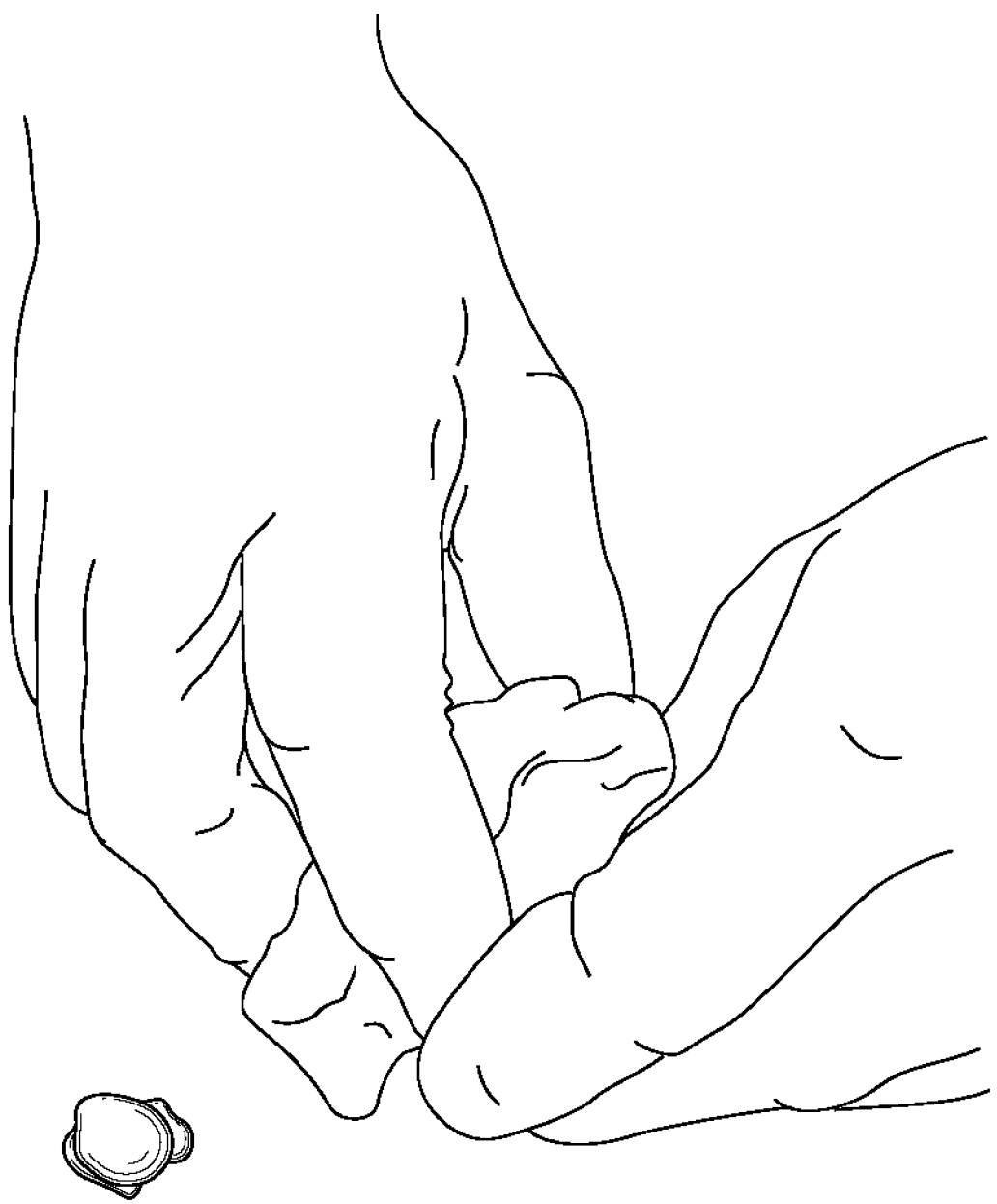
FIG. 6 is a front perspective view of the meat retraction step 50 of FIG. 1.

At retraction step 50 the meat still on the thigh bone is manually displaced from proximate the ball joint toward the opposing end of the thigh without removing the meat. As seen in FIG. 6 this is most conveniently accomplished by straddling the exposed tip of the bone at the ball joint with two fingers and pulling the fingers back along the thigh bone to retract the meat, thereby leaving optimally a 0.25" (0.635 cm) length of thigh bone protruding at the ball joint, and acceptably within a range of from 0.25-1.0" (0.635-2.54 cm). As seen in FIG. 6 this retraction step bunches the meat remaining on the thigh bone at the proximal end farthest from the joint. Optionally, if desired, the tendons and meat clinging to the bone at the ball joint can be shaved therefrom (without removing any meat) to make the retraction step easier. The remaining meat is fully retracted when it remains bunched at the opposing end, leaving a 0.25-1.0" (0.635-2.54 cm) section of bone running to the ball joint free and clear of meat.

One skilled in the art should understand that the above-described method may be automated or semi-automated without departing from the scope or spirit of the invention. For example, the frenching step 40 and retraction step 50 may be combined accomplished with a tubular blade that straddles the exposed tip of the bone at the ball joint and both frenches and retracts the meat, likewise leaving approximately a 0.635-2.54 cm (0.25-1") length of thigh bone protruding at the ball joint.

Given the restructured thigh as per above, with approximately a 0.635-2.54 cm (0.25-1") length of thigh bone protruding at the ball joint and approximately 0.787 inches (2 cm) of meat surrounding the remaining thigh bone, the restructured thigh may be cooked preferably by baking approximately ten minutes followed by flash frying 2-3 minutes. The baking serves to draw the meat away from the bone at the ball joint, accentuating the frenching. Flash frying bleaches the bone to build positive eye appeal and crisps the surface of the meat to more closely resemble a fried wing in taste and texture.

In practice it was found that for smaller thighs it is not necessary to make both left and right thigh trim cuts. Only one trim cut is needed on one side to accomplish the sought-after result, preferably trimming the larger side (the femoris muscle) down to 0.787 inches (2 cm), again followed by frenching and bunching.

It should now be apparent that the above-described restructuring process produces an imitation wing drumette in shape, size, texture, taste and appearance, and retains those qualities after baking and flash frying. Thus, the "thigh wing" looks, tastes and feels like a wing drumette, essentially giving the very same taste experience and making Buffalo wings possible from thighs. Although the present subject matter has been described with reference to specific exemplary embodiments, it will be evident that various modifications and changes may be made to these embodiments without departing from the broader spirit and scope of the subject matter. Accordingly, the specification and drawings are to be regarded in an illustrative rather than exhaustive or to limit the invention to the precise forms disclosed. Many variations and modifications of the embodiments described herein will be obvious to one of ordinary skill in the art in light of the above disclosure. The scope of the invention is to be defined only by the claims, and by their equivalents.

What is claimed is:

1. A method for restructuring a chicken thigh to resemble a chicken wing drumette, comprising the steps of:
   obtaining a processed chicken thigh piece having a bone-in, the bone running end-to-end from a cut end to a ball joint;
   trimming off a majority of the thigh meat along the left side of the thigh bone to leave a narrow bulk of meat remaining on the left side;
   trimming off a majority of the thigh meat from the right side of the thigh bone to leave a narrow bulk of meat remaining on the right side;
   exposing the thigh bone at the ball joint;
   frenching the chicken thigh piece about the ball joint;
   retracting said meat along the left and right sides of the thigh bone back away from the ball joint to leave approximately a 0.25-1" length of thigh bone protruding at the ball joint and a ball of bunched meat at the opposing end of the thigh bone.

2. The method for restructuring according to claim 1, wherein said step of trimming off a majority of the thigh meat along the left side of the thigh bone comprises a left trim cut made along a line $T_L$ offset within a range of from 0.394-1.575 inches (1 cm-4 cm) from the thigh bone.

3. The method for restructuring according to claim 2, wherein said step of trimming off a majority of the thigh meat along the right side of the thigh bone comprises a right trim cut made along a line $T_L$ offset within a range of from 0.394-1.575 inches (1 cm-4 cm) from the thigh bone.

4. The method for restructuring according to claim 3, wherein said left and right thigh trim cuts collectively remove all but approximately 0.787 inches (2 cm) of thigh meat from both sides of said thigh bone.

5. The method for restructuring according to claim 4, wherein said left side trim cut is made along a line +/−5 degrees from parallel to said thigh bone and offset therefrom.

6. The method for restructuring according to claim 5, wherein said right side trim cut is made along a line +/−5 degrees from parallel to said thigh bone and offset therefrom.

7. The method for restructuring according to claim 5, wherein said left side trim cut is offset within a range of from 0.394-1.575 inches (1 cm-4 cm) from the thigh bone.

8. The method for restructuring according to claim 7, wherein said right side trim cut is offset within a range of from 0.394-1.575 inches (1 cm-4 cm) from the thigh bone.

9. The method for restructuring according to claim 1, further comprising a step of trimming meat from the ball joint of said thigh bone to expose within a range of from 0.25-1.0" (0.635-2.54 cm) of a distal tip of the thigh bone.

10. The method for restructuring according to claim 9, wherein said step of trimming meat exposes approximately 0.25" of a distal tip of the thigh bone.

11. The method for restructuring according to claim 2, wherein said step of frenching comprises four-to-six even shaving strokes at equal angular intervals encircling the thigh bone.

12. The method for restructuring according to claim 2, wherein said step of bunching is accomplished by straddling the distal tip of the thigh bone at the ball joint with two fingers and pulling the fingers down along the thigh bone to retract the meat.

13. A method for restructuring an existing chicken thigh to produce a mock chicken wing there from, said existing chicken being skinless, thigh bone-in, dejointed at one end for removal from the chicken and cut at another end to remove the drumstick, said method comprising the steps of:
   trimming meat from one side of said existing chicken thigh by making a first thigh trim cut substantially parallel to said thigh bone and offset therefrom to remove a majority of meat from said one side;
   trimming meat from an opposing side of said existing chicken thigh by making a second thigh trim cut substantially parallel to said thigh bone and offset therefrom to remove a majority of meat from said opposing side;
   trimming meat from the ball joint of said thigh bone to expose a distal tip of the thigh bone; frenching meat away from the thigh bone by shaving meat away from the thigh bone without severing it in a plurality of downward strokes beneath the ball joint spaced at equal angular intervals around the thigh bone; and
   bunching meat remaining on the thigh bone toward the cut end of the thigh bone by displacing meat proximate the ball joint toward the cut end of the thigh bone without removing the meat.

14. The method for restructuring according to claim 13, wherein said first thigh trim cut is made along a line $T_L$ offset within a range of from 0.394-1.575 inches (1 cm-4 cm) from the thigh bone.

15. The method for restructuring according to claim 14, wherein said first thigh trim cut removes all but approximately 0.787 inches (2 cm) of thigh meat from one side of said thigh bone.

16. The method for restructuring according to claim 14, wherein said second thigh trim cut is made along a line $T_R$ within an acceptable range of from +/−5 degrees from parallel to said thigh bone but offset to an opposing side there from.

17. The method for restructuring according to claim 16, wherein said second thigh trim cut is made along a line $T_R$ offset within a range of from 0.394-1.575 inches (1 cm-4 cm) from the thigh bone.

18. The method for restructuring according to claim 17, wherein said second thigh trim cut removes all but approximately 0.787 inches (2 cm) of thigh meat from said opposing side of said thigh bone.

19. The method for restructuring according to claim 13, wherein said step of trimming meat from the ball joint of said thigh bone exposes within a range of from 0.25-1.0" (0.635-2.54 cm) of a distal tip of the thigh bone.

20. The method for restructuring according to claim 13, wherein said step of trimming meat exposes approximately 0.25" of a distal tip of the thigh bone.

21. The method for restructuring according to claim 13, wherein said step of frenching meat away from the thigh bone comprises four-to-six even strokes at equal angular intervals encircling the thigh bone.

22. The method for restructuring according to claim 13, wherein said step of bunching is accomplished by straddling the distal tip of the thigh bone at the ball joint with two fingers and pulling the fingers down along the thigh bone to retract the meat.

23. A method for restructuring an existing chicken thigh to produce a mock chicken wing there from, said existing chicken being skinless, thigh bone-in, dejointed at one end for removal from the chicken and cut at another end to remove the drumstick, said method comprising the steps of:
   trimming meat from said existing chicken thigh by making a thigh trim cut substantially parallel to said thigh bone and offset therefrom to remove a majority of meat from said one side;
   frenching meat away from the thigh bone by shaving meat away from the thigh bone without severing the meat in a plurality of downward strokes beneath the ball joint spaced at equal angular intervals around the thigh bone; and
   bunching meat remaining on the thigh bone toward the cut end of the thigh bone by displacing meat proximate the ball joint toward the cut end of the thigh bone without removing the meat.

* * * * *